United States Patent
Abramowitz et al.

(10) Patent No.: US 6,572,902 B2
(45) Date of Patent: Jun. 3, 2003

(54) PROCESS FOR PRODUCING IMPROVED ALKALINE DRINKING WATER AND THE PRODUCT PRODUCED THEREBY

(75) Inventors: Robert M. Abramowitz, Mercer Island, WA (US); George Arnold, Seattle, WA (US)

(73) Assignee: Advanced $H_2O$, Inc., Bellevue, WA (US)

( * ) Notice: Subject to any disclaimer, the term of this patent is extended or adjusted under 35 U.S.C. 154(b) by 0 days.

(21) Appl. No.: 09/843,086

(22) Filed: Apr. 25, 2001

(65) Prior Publication Data

US 2002/0158018 A1 Oct. 31, 2002

(51) Int. Cl.$^7$ .................................................. A23L 2/00
(52) U.S. Cl. ........................ 426/66; 426/74; 204/228.3; 204/263; 210/87; 210/259; 210/748; 210/406; 210/652; 205/743; 205/747
(58) Field of Search .................. 210/87, 96.1, 96.2, 210/192, 195.1, 198.1, 202, 243, 257.2, 259, 739, 743, 748, 805, 806; 204/228.1, 228.3, 228.6, 263; 426/66, 74, 590, 633; 205/742, 743, 746, 747, 751

(56) References Cited

U.S. PATENT DOCUMENTS

| 4,528,093 A | * | 7/1985 | Winer .................... 210/96.2 |
| 4,983,409 A | * | 1/1991 | Nasu ........................ 426/66 |
| 5,051,161 A | * | 9/1991 | Yamaguchi et al. ........ 204/263 |
| 5,174,901 A | * | 12/1992 | Smith ..................... 210/806 |
| 5,306,511 A | * | 4/1994 | Whang .................... 426/66 |
| 5,597,487 A | * | 1/1997 | Vogel et al. ............. 210/259 |
| 5,736,027 A | * | 4/1998 | Nakamura ............... 210/748 |
| 6,315,886 B1 | * | 11/2001 | Zappi et al. ............. 204/263 |

FOREIGN PATENT DOCUMENTS

RU          2001944       * 10/1993

* cited by examiner

*Primary Examiner*—Joseph Drodge
(74) *Attorney, Agent, or Firm*—Jensen & Puntigam, P.S.

(57) ABSTRACT

A process for producing improved alkaline water includes filtering potable source water to remove selected particles and then purifying the filtered water. Selected alkaline minerals are added to the purified water, with the resulting mineralized water being then electrolyzed to produce streams of acidic water and alkaline water, the alkaline water having a pH within the range of 9–10, a TDS range of 22–240 ppm (parts per million) and alkalinity in the range of 12–216 ppm.

28 Claims, 1 Drawing Sheet

PROCESS FOR PRODUCING IMPROVED ALKALINE DRINKING WATER AND THE PRODUCT PRODUCED THEREBY

TECHNICAL FIELD

This invention relates generally to alkaline drinking water, and more specifically concerns a process for producing an improved alkaline drinking water using electrolysis, as well as the product produced by the process.

BACKGROUND OF THE INVENTION

Alkaline drinking water, for the purposes of this explanation, is water having a pH above 9.0, although water with a pH above 7.0 is by general definition alkaline. Alkaline drinking water is usually produced by electrolysis of potable source water, which results in separate alkaline and acidic (pH below 7.0) streams of water. Alkaline drinking water can be produced, alternatively, by adding alkaline minerals to potable source water, such as tap water.

Alkaline drinking water is known to have certain health benefits, including antioxidant properties. This has been demonstrated by a number of laboratory studies, including a study by Shirahata et al, entitled "Electrolyzed-Reduced Water Scavenges Active Oxygen Species and Protects DNA from Oxidative Damage", *Biochem. Biophys. Res.Commun.*, 234, Pages 269–274 (1997). Other studies have confirmed such findings of antioxidant properties and other health benefits of alkaline water.

There have been various attempts to enhance the effect of alkaline drinking water, including the addition thereto of particular vitamins, such as Vitamin C. In one case, Vitamin C was added to electrolyzed alkaline water (alkaline water produced by electrolysis), with the resulting solution again electrolyzed. This is described in U.S. Pat. No. 5,736,027 to Nakamura. In other cases, various minerals have been added to ordinary tap water, with the resulting mineralized tap water then being electrolyzed to produce alkaline drinking water.

Apart from drinking water, electrolyzed alkaline water has also been used for certain cleaning applications, particularly in the manufacture of semiconductors, including semiconductor etching, and in certain medical treatment applications. Such applications involving alkaline water are described in U.S. Pat. Nos. 5,762,779 and 5,938,915, among others. The present invention, however, is directed toward specific improvements in alkaline drinking water by the use of a specific sequence of processing steps, beginning with a source of potable water, such as tap water.

DISCLOSURE OF THE INVENTION

Accordingly, the present invention is a process for producing improved alkaline drinking water, which comprises the steps of: filtering potable water from a source thereof so as to remove particles greater than a preselected size; directing the filtered source water through a water purification unit so as to produce purified water with a total dissolved solids no greater than ten ppm; adding selected alkaline minerals to the purified water so that the resulting mineralized water has a selected mineral concentration of between 20–200 ppm; and electrolyzing the mineralized water to produce alkaline water with a pH in the range 9–10, wherein total dissolved solids of the alkaline water are within the range of 20–240 ppm and the alkalinity of the alkaline water is within the range of 12–216 ppm.

The invention also includes the product produced by the above process, and also an proved alkaline drinking water product which comprises potable water which has been filtered and purified, with a total dissolved solids of less and then with the resulting total dissolved solids of less than ten ppm, to which is subsequently added selected alkaline minerals, and then electrolyzed so as to produce alkaline water having a pH in the range of 9–10 with a total dissolved solids of 20–240 ppm and alkalinity of 12–216 ppm.

The invention also includes a system for producing improved alkaline drinking water, which comprises: a water filter for filtering potable source water which is applied thereto so as to remove particles greater than a preselected size; a water purification unit for producing purified water from the filtered water, with total dissolved solids no greater than 10 ppm; means for adding selected alkaline minerals to the purified water so that the resulting mineralized water has a selected mineral concentration of between 20–200 ppm and an electrolyte cell assembly for electrolyzing the mineralized water to produce alkaline water with a pH in the range of 9–10, wherein total dissolved solids of the alkaline water are within the range of 20–240 ppm and alkalinity is within the range of 12–216 ppm.

BEST MODE FOR CARRYING OUT THE INVENTION

Figure 1:
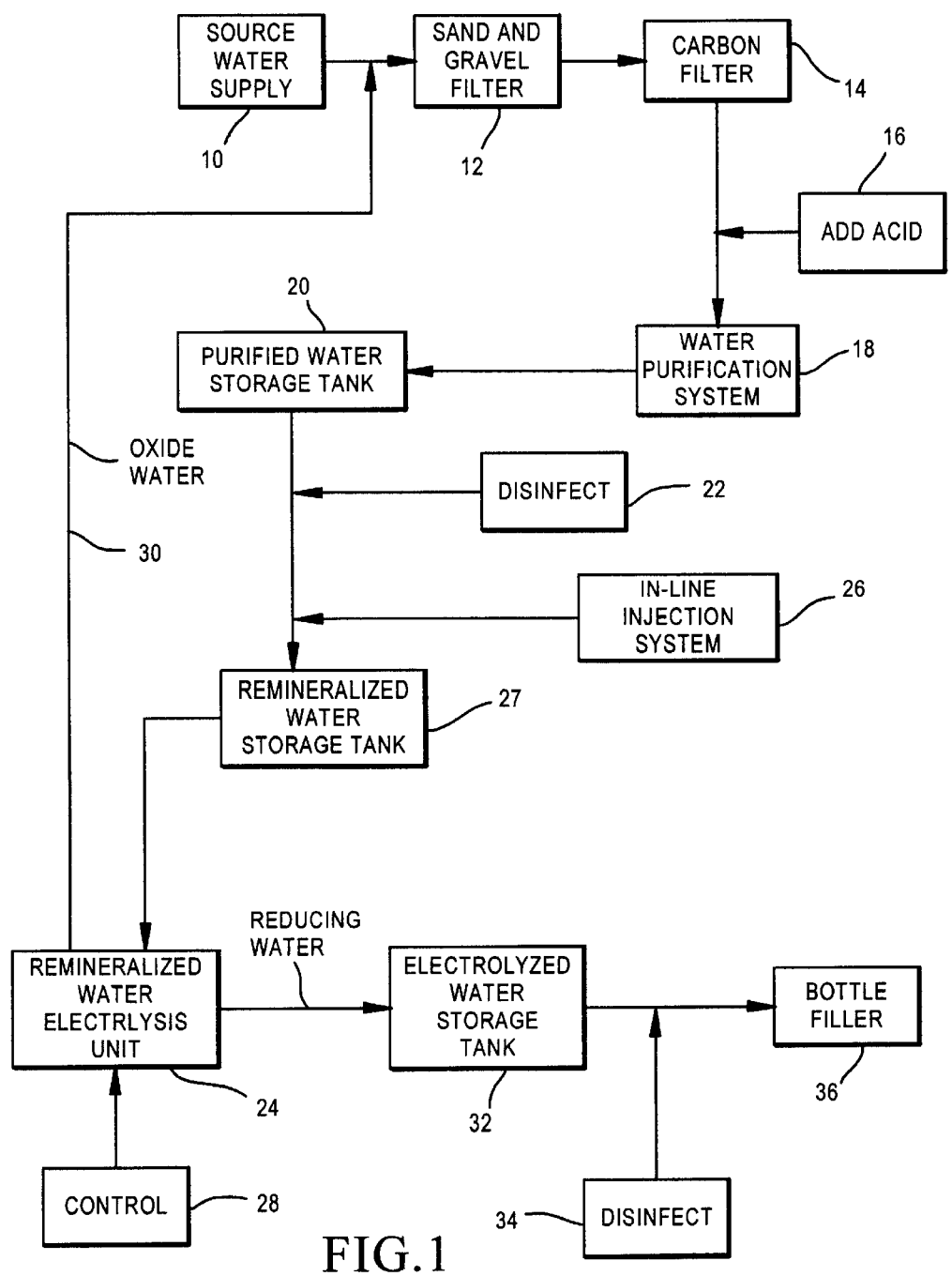
FIG. 1 is a block diagram showing the sequence of steps in the process of the present invention leading to improved alkaline drinking water.

The present invention is a process for producing alkaline drinking water (hereafter alkaline water) which includes a conventional electrolysis step. The present process thus shares with many other known processes for making alkaline water an electrolysis step. Basically, electrolysis includes a plurality of two-chamber electrolytic cells, each cell including an anode chamber and a cathode chamber, with an ion exchange membrane serving as a diaphragm between the two chambers. One example of such an electrolytic cell is shown in U.S. Pat. No. 5,762,779, the contents of which are hereby incorporated by reference. The membrane significantly restricts water from passing therethrough, but allows ions to readily pass through. One of the chambers is an anodic chamber, with an anode positioned therein, while the other is a cathodic chamber and has a cathode disposed therein. The cathode and the anode elements comprise, for example, platinum or carbon. Other metals could also be used.

In operation, the anode element in the anodic chamber is connected to the positive terminal of a DC voltage source, while the cathode element is connected to the negative terminal of the DC voltage source. An electric field is thus generated across the cell. An electrolyte such as carbon dioxide with an electrolytic salt of ammonia acetate ($CH_3COONH_4$ are examples) may be added if necessary to initiate and/or enhance current flow between the electrodes. In general, when a DC voltage is applied between the anode and cathode at a sufficiently high voltage, an electric current is generated, flowing between the electrodes. The electric current produces electrolysis of the water. At the surface of the anode element is generated oxygen gas, producing anodic (acidic) water having a relatively low pH value, as indicated above, while at the cathode element, hydrogen gas is generated, resulting in cathodic (alkaline) water, which has a relatively high pH value. Thus, the result of the operation of the electrolytic cell is two streams of water, one of which is acidic and the other of which is alkaline.

Referring now to FIG. 1 with respect to the process of the present invention, a supply of source water 10 is necessary to begin the process. Source water may come from any potable supply. It can be tap water, such as from a public supply, which may vary widely in mineral content and may contain chlorine or other additives, or it can be from other water sources, including private or public wells.

In the next step, the potable water from source 10 is filtered. In the embodiment shown, filtering is accomplished in two steps or stages. The first filtration stage is generally a multi-media or a graded density depth filter 12, using sand and gravel, of various dimensions, which removes large particles and oxidized metals such as iron and manganese which may still be in the source water. Such a sand and gravel filter 12 is conventional. Oxidized metals are typically present in water from a public water supply; such water also likely has been treated with chlorine.

The next stage of the filtering portion of the process is an activated carbon filter 14. Activated carbon filter 14, which also is conventional, is a known element in water treatment, and is used to remove particles of a selected size as well as absorbing low molecular weight organic material and chlorine.

In combination, the two stages of filtration 12 and 14 are designed to remove the particulate matter in the source water to a level (size) of approximately 5 microns, to protect a membrane element used in a later, purification step of the process.

At this point, acid may be added at 16 to the filtered water to lower the pH to less than 6.7, in order to shift the bicarbonate concentration in the water toward carbonic acid, which has the desired effect of minimizing the potential for calcium carbonate precipitation on the water purification membrane. This step, however, may not be necessary in many applications.

The resulting water is then directed to a reverse osmosis water purification unit (system) 18 which provides the purification step for the present process. The reverse osmosis (RO) unit 18 is also conventional, and may be either a one or two-stage system, depending upon the initial quality of the source water. Typically, the reverse osmosis unit includes a semi-permeable membrane which separates the water into two separate streams, a product stream and a waste stream. The waste stream is disposed of in some manner, such as into a wastewater drain; the product stream is the desired purified water. The reverse osmosis unit 18 is capable of removing a number of different elements from the water, including bacteria, various salts, sugars, proteins and particles of varying sizes, including the smaller ions with a molecular weight greater than 150–250 Daltons. Purification also removes any odor from the source water.

The resulting purified water from the water purification system 22 typically has a total dissolved solids (TDS) range of from 1–10 parts per million (ppm), with a pH in the range of 5.5–6.5. The purified water is directed from the water purification system 18 to a storage tank 20, which serves as a reservoir for the purified water prior to the electrolytic cell portion 24 of the present system. Storage tank 20, however, is not a necessary part of the present invention; purified water from the water purification system may flow to the electrolytic cell 24 without intermediate storage.

At this point, the filtered, purified water which has been adjusted for pH by adding acid is preferably disinfected at 22 by either ultraviolet radiation or treatment with ozone, to reduce the colony forming units (CFU) to a level below 5. Such a disinfectant step may also not be necessary in particular applications.

Prior to the electrolytic cell 24, however, is positioned an in-line injection system 26, which injects a concentrated mineral mix into the purified water as it is being moved, typically by a pump (not shown), to electrolytic cell 24. The rate of mineral injection can be varied to adjust the purified water mineral concentration to a desired level. In the embodiment shown, this is between 20–200 ppm, depending upon the desired characteristics of the final water product. The added minerals are typically alkaline and may include several different alkaline minerals, including magnesium, calcium, potassium and sodium, among others. Typically, the added minerals will include at least calcium and potassium. The addition of selected minerals is important to the process and the final product, as they provide the desired antioxidant effects, as well as other health benefits.

In addition to the alkaline minerals, other elements may be added at this point, including selected vitamins such as Vitamin C, and selected soluble herbs. Other typical vitamins added include B6, B12 and others, again depending upon the desired characteristics of the final water product. The invention is not limited to particular vitamins, nor is the addition of any vitamins or herbs essential. The intention of this portion 26 of the process is to add elements to the purified water which are known to have a health benefit. The result of the addition of the alkaline minerals, to produce a concentration of between 20–200 ppm, as well as the possible addition of other elements, is a mineralized water having a pH within the range of 8.0–8.8, and a total alkalinity of between 20 and 180 ppm. The mineralized water may then be directed to a storage tank 27, although, again, this is not an essential part of the process. Storage tank 27 does permit flexibility in the process, as it allows more convenient, controllable operation times for the electrolytic cell 24.

The resulting water, referred to herein as mineralized water, is then directed to electrolytic cell 24, where electrolysis of the mineralized water is carried out. Electrolytic cell 24 represents a plurality of cells, depending on the desired production rate. The structure and operation of a typical electrolytic cell was explained above. It should be understood that the electrolysis portion of the present process can be accomplished by various types of electrolytic cells. The important result of the electrolysis step is that the incoming mineralized water is electrolyzed, as that term is conventionally understood, i.e. the incoming mineralized water is separated into two separate streams, one being acidic and one being alkaline.

In operation, mineralized water is directed into both the cathode and anode chamber portions of the electrolytic cell. The water flow into the two chambers is adjusted so that there is a selected ratio within the range of 1:1 to 25:1 between the cathode chamber flow and the anode chamber flow, depending on the particular electrolytic cells used.

The pH of the alkaline water stream is controlled by adjusting the electrolysis current through the cell. The control system 28 will automatically adjust the voltage applied to the positive and negative electrodes to maintain the level of current necessary for the desired pH value. Variations in the flow rate of mineralized water to the electrolytic cell or in the mineral concentration (TDS) of the mineralized water will require adjustment of the current level. The desired pH of the alkaline water is assured by making continuous adjustments to the current passing through the electrolytic cell. Current levels up to 100 amps, or even more in particular circumstances, are used. Water conductivity and flow rates are important variants in determining the current levels.

In operation of electrolytic cell 24, the polarity of the two electrodes will be switched on a preprogrammed, regular basis, in combination with switching of the resulting product flow path, to accomplish periodic cleaning of the electrodes.

The products resulting from electrolytic cell 24 are two streams of water, one being alkaline and the other being acidic. The low pH (acidic) water from the electrolyzing (anode) chamber typically will have a pH in the range of 5–7. This acidic water, as shown in the figure, is sent back to the source 10 for reprocessing, as shown by connecting line 30. This is done because of the relatively large volume of acidic water resulting from the operation of the electrolytic cell. Typically, there may be up to 7 gallons of acidic water for every 25 gallons of alkaline water. The application of the acidic water back to the source 10 is for the purpose of water conservation. It is not necessary, however, to the present invention.

The improved alkaline water from the electrolytic cell 24 has a pH in the range of 9.0 to 10.0, with the TDS and alkalinity being both increased by 10–30% from the incoming water to cell 24. The TDS will range from 22–240 ppm, while the alkalinity, typically in the form of calcium carbonate, will range from 12–216 ppm.

The resulting alkaline water from the electrolytic cell 24, referred to as electrolyzed alkaline water, is improved over existing alkaline drinking water in a number of respects, including the specified characteristics of pH, TDS and total alkalinity.

The electrolyzed alkaline water is directed to a storage tank 32, which again is not a necessary part of the process, but in many cases is convenient for overall system operation. The electrolyzed alkaline water may then be disinfected again at 34 by ultraviolet exposure to reduce the colony forming units to below 3 (zero is preferred and is typically obtained by the step of disinfecting). Following that, the water is delivered to a conventional bottling facility 36 for bottling and distribution.

The various storage units 20, 27 and 32 are helpful in the process, in that the production of the electrolyzed alkaline water may continue in the event that the bottling unit malfunctions or needs to be stopped for a time. The storage units result in the overall system being more efficient.

The operation of the present system is automatically controlled to ensure proper operation. The operation of the electrolytic cell is controlled by a conventional control system, as shown at 28. The overall system is under preprogrammed (computer) control. The control system includes conventional elements and control setting capability, including various visual control functions, such as a touch screen, to set current flow limits and to monitor system operations. The flow rate and other aspects of the system are continually monitored to maintain the resulting alkaline water product within the desired pH range.

The system of the present invention includes a number of monitoring elements to ensure proper operation, including temperature, water flow rate and conductivity sensors. These sensors, respectively, are located at various points in the system to ensure proper pH value of the water prior to and following the water purification unit, as well as the desired total dissolved solids (TDS) after mineral addition and desired pH and TDS before and after electrolysis. The water may be sampled from selected points along the water line before and after units 18, 24 and 27 to test for pH, TDS, chlorine and/or bacteria in addition to and/or as an alternative to in-line measurements.

The present invention thus includes a novel sequence of steps, beginning with potable water, and including filtration and purification thereof, to produce purified water having total dissolved solids of less than 6 ppm, i.e. approximately 98% pure. The water is then re-mineralized, and then electrolysis is performed, to produce alkaline and acidic water streams. The alkaline water stream has specific, preselected characteristics, with selected range set forth above; the process is controlled to maintain the specified, preselected characteristics of the alkaline water. The resulting electrolyzed alkaline drinking water is odor-free, with a pleasant taste, and has the potential of significant health benefits, include antioxidant capability.

Hence, a process for producing improved alkaline water and the resulting product has been disclosed. It should be understood, however, that various changes, modifications and substitutions can be made to the preferred embodiment without detracting from the spirit of the invention which is set forth by the claims which follow.

What is claimed is:

1. A process for producing improved alkaline drinking water, comprising the steps of:

filtering potable source water to remove particles greater than a preselected size;

directing the filtered source water through a water purification unit to produce purified water with total dissolved solids no greater than 10 parts per million;

adding selected alkaline minerals to the purified water so that the resulting mineralized water has a selected mineral concentration of between 20–200 parts per million; and electrolyzing the mineralized water to produce alkaline water with a pH in the range of 9–10, wherein total dissolved solids of the alkaline water is within the range of 22–240 parts per million and alkalinity thereof is within the range of 12–216 parts per million.

2. A process of claim 1, wherein in the electrolyzing step including the step of controlling generation of electrolysis current to produce the alkaline water.

3. A process of claim 2, including the step of adjusting the level of electrolysis current, depending upon the rate of mineralized water flow and the conductivity of the mineralized water to be electrolyzed.

4. A process of claim 1, wherein the filtering step removes selected organic materials.

5. A process of claim 1, wherein the filtered source water is purified by reverse osmosis.

6. A process of claim 1, wherein the purified water has a total dissolved solids of less than 6 parts per million.

7. A process of claim 1, wherein at least the following alkaline minerals are added to the purified water: calcium and potassium.

8. A process of claim 1, including the step of adding at least one selected vitamin to the purified water.

9. A process of claim 1, including the step of adding selected soluble herbs to the purified water.

10. A process of claim 1, including the step of adding sodium, potassium, magnesium and calcium and Vitamin C to the purified water.

11. A process of claim 1, including the step of adding acidic water produced by the step of electrolyzing back to the potable source water.

12. An improved alkaline drinking water product, comprising:

potable water which has been filtered and purified, with a total dissolved solids of less than 10 parts per million, to which has been added selected alkaline minerals, and which has then been electrolyzed to produce alkaline water having a pH in the range of 9–10, with a TDS (total dissolved solids) of 22–240 ppm and an alkalinity of 12–216 ppm.

13. A product of claim 12, wherein the alkalinity is produced by calcium carbonate.

14. A product of claim 12, wherein the TDS and total alkalinity have been increased by 10–30% by electrolysis.

15. A product of claim 12, wherein the added alkaline minerals include at least calcium and potassium.

16. A product of claim, 15, including the addition of at least one selected vitamin to the electrolyzed water prior to its being electrolyzed.

17. A product of claim 16, wherein the added alkaline minerals include sodium potassium, magnesium and calcium and the at least one added vitamin includes at least vitamin C.

18. A product produced by the process comprising the steps of:
   filtering potable source water to remove particles greater than a preselected size;
   directing the filtered source water through a water purification unit to produce purified water with total dissolved solids no greater than 10 parts per million;
   adding selected alkaline minerals to the purified water so that the resulting mineralized water has a selected mineral concentration of between 20–200 parts per million; and
   electrolyzing the mineralized water to produce alkaline drinking water with a pH in the range of 9–10, wherein total dissolved solids of the alkaline water is within the range of 22–240 parts per million and alkalinity thereof is within the range of 12–216 parts per million.

19. A product of claim 18, wherein the purified water has a total dissolved solids of less than 10 parts per million.

20. A product of claim 18, wherein at least the following alkaline minerals are added to the purified water: calcium and potassium.

21. A product of claim 18, wherein at least the following vitamin is added to the purified water: vitamin C.

22. A system for producing improved alkaline drinking water, comprising:
   a water filter for filtering potable source water applied thereto to remove particles greater than a preselected size;
   a water purification unit operable for producing purified water from the filtered water with total dissolved solids no greater than 10 parts per million;
   means for adding selected alkaline minerals to the purified water so that the resulting mineralized water has a selected mineral concentration of between 20–200 parts per million; and
   an electrolytic cell assembly operable for electrolyzing the mineralized water to produce alkaline water with a pH in the range of 9–10, such that the total dissolved solids of the alkaline water is within the range of 22–240 parts per million and alkalinity thereof is within the range of 12–216 parts per million.

23. A system of claim 22, wherein the water purification unit is a reverse osmosis unit.

24. A system of claim 22, wherein at least calcium and potassium are added to the purified water.

25. A system of claim 22, including means directing acidic water produced by the electrolysis cell assembly back to the potable source water to be applied to the filter.

26. A system of claim 22, including a computer control for the system.

27. A system of claim 22, including at least one storage tank for temporary storage of at least one of the following: the purified water; the mineralized water; and the electrolyzed alkaline water.

28. A system of claim 22, including sensor elements for the system for monitoring the flow rate, the pH and the total dissolved solids in the water at selected points in the system.

* * * * *